United States Patent
Keller et al.

(10) Patent No.: US 10,160,360 B2
(45) Date of Patent: Dec. 25, 2018

(54) COVER ASSEMBLY AND STORAGE COMPARTMENT WITH COVER

(71) Applicant: GRAMMER AG, Amberg (DE)

(72) Inventors: Hubert Keller, Kuemmersbruck (DE); Johann Kaa, Freudenberg (DE)

(73) Assignee: GRAMMER AG, Amberg (DE)

( * ) Notice: Subject to any disclaimer, the term of this patent is extended or adjusted under 35 U.S.C. 154(b) by 0 days.

(21) Appl. No.: 15/419,054

(22) Filed: Jan. 30, 2017

(65) Prior Publication Data
US 2017/0232902 A1    Aug. 17, 2017

(30) Foreign Application Priority Data

Jan. 29, 2016 (DE) .................. 10 2016 000 909

(51) Int. Cl.
| | |
|---|---|
| *B60N 3/00* | (2006.01) |
| *B60N 2/75* | (2018.01) |
| *B60R 7/04* | (2006.01) |
| *B60R 7/06* | (2006.01) |

(52) U.S. Cl.
CPC .............. *B60N 2/75* (2018.02); *B60N 3/00* (2013.01); *B60R 7/04* (2013.01); *B60R 7/06* (2013.01)

(58) Field of Classification Search
CPC ... B60R 7/04; B60R 2011/0007; B60R 11/00; B60R 13/0262; B60R 13/0206; B60R 11/0241; B60R 11/0252
USPC ........ 296/24.34, 37.8, 1.08, 1.09, 64, 190.1, 296/193.04, 1.02, 1.11, 24.31, 37.14
See application file for complete search history.

(56) References Cited

U.S. PATENT DOCUMENTS

| | | | | |
|---|---|---|---|---|
| 5,505,516 A | * | 4/1996 | Spykerman | B60N 3/102 248/311.2 |
| 6,409,136 B1 | * | 6/2002 | Weiss | B60N 3/102 224/926 |
| 2009/0066102 A1 | * | 3/2009 | Shiono | B60R 7/04 296/24.34 |
| 2009/0256376 A1 | * | 10/2009 | Schneider | B60R 7/04 296/24.34 |
| 2010/0066113 A1 | * | 3/2010 | Browne | B60N 3/102 296/24.34 |
| 2011/0018297 A1 | * | 1/2011 | Chheang | B60R 13/0262 296/24.34 |

(Continued)

FOREIGN PATENT DOCUMENTS

| | | | | |
|---|---|---|---|---|
| DE | 102011120881 A | | 6/2013 | |
| DE | 102011120881 A1 | * | 6/2013 | ........... B60N 2/4686 |

*Primary Examiner* — D Glenn Dayoan
*Assistant Examiner* — Sunsurraye Westbrook
(74) *Attorney, Agent, or Firm* — Andrew Wilford

(57) ABSTRACT

A cover assembly has a support defining a pivot axis, a cover pivotal relative to the support about the pivot axis between an open position and a closed position, and a torque spring having first and second ends, a biasing coil part from which the first end extends, and a gripping coil part extending from the biasing coil part and from which the second end extends. The first end is seated in the cover, and the gripping coil part, except when is installed or adjusted, frictionally tightly and elastically engages the support and nonrotatably secures the second end to the support against rotation relative to the pivot axis. The gripping coil part is elastically deformable during installation or adjustment to disengage from the support and allow angular or axial movement of the gripping coil part and repositioning on the support.

11 Claims, 5 Drawing Sheets

(56) References Cited

U.S. PATENT DOCUMENTS

2012/0319422 A1* 12/2012 Kang .................. B60R 7/04
                                                     296/24.34
2016/0159289 A1*  6/2016 Gaudig ................ B60R 7/04
                                                     296/37.8

* cited by examiner

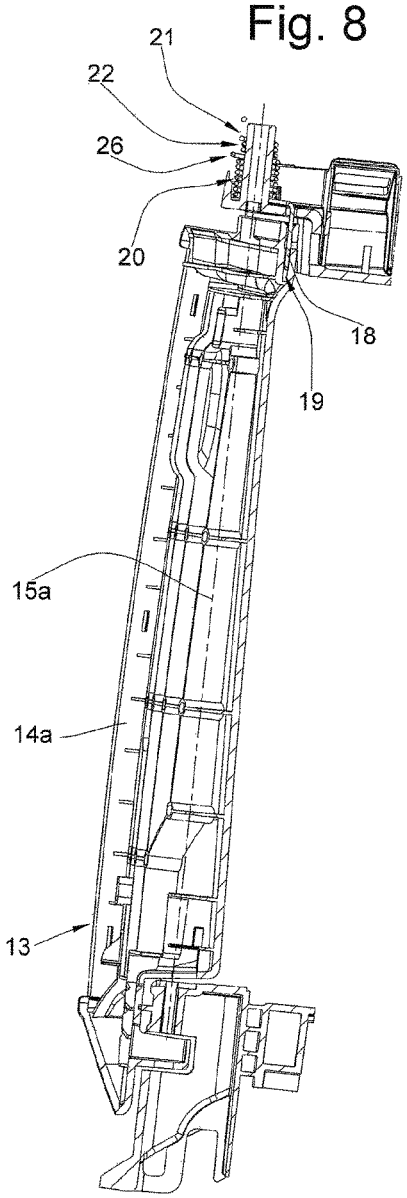
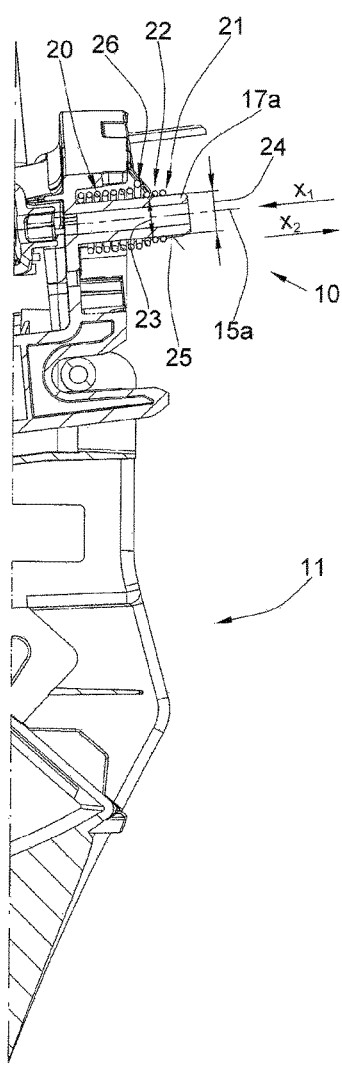

COVER ASSEMBLY AND STORAGE COMPARTMENT WITH COVER

FIELD OF THE INVENTION

The present invention relates to a cover assembly for a storage compartment. More particularly this invention concerns a storage compartment with a cover.

BACKGROUND OF THE INVENTION

A cover assembly as described in German 10 2011 120 881 is typically provided for closing a, for example, motor-vehicle storage compartment. The cover can move between closed and open positions. The cover can be locked in the closed position by a latch, and is biased into the open position by a spring.

The spring has first and second legs. The first leg is connected to and moves with the cover to bias it into the open position. The second leg is connected to a fixed support formed, for example, by the frame of the cover, by the center console, or by the housing of the storage compartment.

The second leg can be set in several different positions relative to the support in order to adjust the spring force. For this purpose several seats are provided in which the second leg can be seated.

OBJECTS OF THE INVENTION

It is therefore an object of the present invention to provide an improved cover assembly and a storage compartment with the cover.

Another object is the provision of such an improved cover assembly and storage compartment with the cover that overcome the above-given disadvantages, in particular in which the spring force is adjustable and where the spring is easy to install.

SUMMARY OF THE INVENTION

A cover assembly has according to the invention a support defining a pivot axis, a cover pivotal relative to the support about the pivot axis between an open position and a closed position, and a torque spring having first and second ends, a biasing coil part from which the first end extends, and a gripping coil part extending from the biasing coil part and from which the second end extends. The first end is seated in the cover, and the gripping coil part, except when is installed or adjusted, frictionally tightly and elastically engages the support and nonrotatably secures the second end to the support against rotation relative to the pivot axis. The biasing coil part urges the cover into one of the end positions. The gripping coil part is elastically deformable during installation or adjustment to disengage from the support and allow angular or axial movement of the gripping coil part and repositioning on the support so that a spring force exerted by the biasing coil part and the first end of the spring on the cover can be adjusted steplessly by releasing and repositioning the gripping coil part. A latch typically is provided to secure the cover in one of the positions. The support is on the frame of a container closable by the cover.

Here, "coil" means that this part of the spring is helical and serves for driving the cover and has a first leg that can be pivoted between a first position and a second position. The first position corresponds, for example, to the closed position of the cover, and the second position corresponds, for example, to the open position of the cover. In other words, when the first leg is in the first position, the cover is in the closed position, for example, and when the first leg is in the second position, the cover is in the open position, for example.

Also, "gripping coil part" means that this portion of the spring is fastened to the support by a force fit in such a way that its position relative to the support is fixed axially and angularly of the axis. The force fit is established by the frictional force between the inner or outer surface of the gripping coil part and the support.

For example, the force fit can be disengaged by increasing or decreasing the diametral dimension of the gripping coil part, depending on whether it is fitted around or inside the support. The entire spring can then be moved relative to the support. That is, the spring can then be rotated and/or moved axially relative to the support. To change the spring bias of the gripping coil part, the force fit can thus be disengaged by spreading or narrowing the gripping coil part and rotating the spring about its longitudinal axis in order to increase or decrease the biasing force. For the purpose of installation in a seat of the support as well, the gripping coil part can be widened or narrowed and the spring subsequently arranged in the seat.

The gripping coil part is then released and then comes to rest against the support as a result of its elastic restorative force. That is, either an inner surface of the gripping coil part bears on an outer surface of the support as a result of decreasing the coil diameter or, according to an alternative, an outer surface of the gripping coil part bears on an inner surface of the support as a result of increasing the coil diameter.

One advantage of the invention is that the spring can be installed with ease. After installation, the spring can easily be released and its position on the support changed. The spring force can easily be adjusted in this way. For example, the opening speeds of two covers can thus be coordinated with one another. Moreover, it is possible according to the invention to adjust the spring force in infinitely variable fashion.

According to one embodiment, the gripping coil part is seated on the support such that, upon release, it can be rotated about its longitudinal axis and/or moved axially. For example, the gripping coil part can be defined axially by the support. For example, the support can have a shoulder that limits the movement of the spring in the axial direction. After the force fit of the gripping coil part is released, the gripping coil part can then be rotated at least relative to the support. According to an alternative, the seat of the support permits axial and rotational movement of at least the gripping coil part relative to the support after the force fit is released.

According to one embodiment, the seat is formed by a cylindrical sleeve or a circular cylindrical recess with a center axis in relation to which a longitudinal axis of the gripping coil part is arranged coaxially. For example, at least the gripping coil part wraps around the support. An inner surface of the gripping coil part is then in contact with an outer surface of the support and holds the spring in its position by force fit. For example, the longitudinal axes of the coil and of the gripping coil part are coaxially to a longitudinal axis of the support.

According to an alternative, at least the gripping coil part is in a cylindrical recess and forms a nonpositive connection with the inner wall of the recess. In this case, an outer surface of the gripping coil part forms the nonpositive connection with the inner wall of the recess. Optionally, the biasing coil is also in the recess.

In both of the above-described embodiments, after releasing the force fit or after the widening or narrowing of the gripping coil part, it is possible for the spring to rotate about the axis and to move axially on or in the support. This facilitates both the installation and adjustment of the pre-stressing of the spring.

For example, a longitudinal axis of the spring is embodied so as to be coaxial with the pivot axis of the cover. In this way, the first leg can be easily connected to the cover. For example, the first leg is in direct contact with the cover. Alternatively, the first leg can also be connected indirectly to the cover. It should be noted, however, that the function of the invention is by no means adversely affected if the longitudinal axis of the spring and the pivot axis of the cover are not coaxial.

The spring comprises a grip formation, for example, whose rotational position does not change independently of the rotational position of the coil and/or of the rotational position of the gripping coil part relative to an installation tool. In terms of the invention, "rotational position" refers to the position relative to the installation tool in the direction of rotation about the longitudinal axis of the spring. The grip formation does not move when the position and hence the tension of the coil change as a result of a movement of the first spring end or when the position and hence the tension the gripping coil part change as a result of a movement of the second spring end. In other words, when the coil and/or the gripping coil part are rotated, the grip formation is not moved along with them.

The grip formation that cooperates with a seat of the tool. The grip formation can be brought into form-fitting contact with a corresponding region of the tool. In this way, rotation of the grip formation about a longitudinal axis of the spring relative to the installation tool is prevented if the first and/or second leg is moved. The grip formation is between the biasing coil part and the gripping coil part, for example.

According to one embodiment, the cover assembly comprises two covers. This offers the advantage that each cover, when in the open position, does not project so far beyond the support, particularly beyond the storage compartment, than if the compartment could be closed with only one cover.

The covers are so-called butterfly covers, for example. Outer edges of the covers are closely juxtaposed in the closed position, for example. For example, the container is covered in a substantially complete manner by the covers in the closed position. Each cover is pivotally mounted so as to rotate about a separate pivot axis between the open position and the closed position. The pivot axes of the covers are parallel to each other, for example. The free cover ends are also arranged so as to be parallel to one another in the closed position, for example.

According to a second aspect, the invention relates to a storage compartment with cover assembly. Such a storage compartment is known from prior use. The storage compartment is part of the center console of the vehicle, for example. The storage compartment can be closed using the cover assembly.

It was an object of the invention to provide a storage compartment that is provided with a cover assembly, with the cover assembly having at least one cover that is spring-loaded, and with the spring force being adjustable.

The storage compartment according to the invention comprises a container and a cover assembly as described above.

According to a third aspect, the invention relates to an installation tool for installing a spring with a gripping coil part in a spring seat. Such an installation tool is known from the prior art but cannot be substantiated with printed publications.

The installation tool is intended for the installation of a spring that comprises at least one gripping coil part. The gripping coil part is a portion of a spring that is embodied as a wrap spring, so that it, as a result of restorative force, can abut in a force-fitting manner with its inner surface against the outer surface of a support or, alternatively, with its outer surface against the inner surface of a support. Using the installation tool, the spring can be installed in a spring seat. The installation tool comprises a receiving area for holding the spring. Furthermore, the installation tool comprises a seat for receiving at least a portion of the spring. In terms of the invention, this means that a portion of the spring or the entire spring can be received in the seat.

One embodiment is characterized in that the seat has a form-fitting region that can be caused to engage in a form-fitting manner with a grip formation of the spring. The seat can be formed by an approximately circular cylindrical recess of the installation tool, for example. The form-fitting region can be embodied on the inner wall of the recess, for example.

BRIEF DESCRIPTION OF THE DRAWING

The above and other objects, features, and advantages will become more readily apparent from the following description, reference being made to the accompanying drawing in which:

FIG. 8 is a section taken along line XIII-XIII in FIG. 7*a*; and

FIG. 9 is a large-scale view of the detail indicated at section line IX-IX of FIG. 6.

SPECIFIC DESCRIPTION OF THE INVENTION

Figure 1:
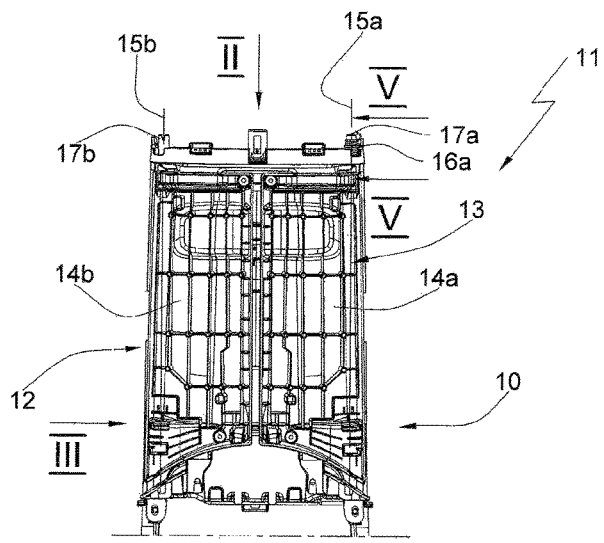
FIG. 1 is a top view of a storage compartment with a cover assembly in a center console of a motor vehicle, with the cover assembly in a closed position.

As seen in FIG. 1, a storage compartment 10 is integrated into a center motor-vehicle console 11 between two unillustrated seats. The storage compartment 10 comprises a container 12 that can be closed by a cover assembly 13. The cover assembly 13 comprises two covers 14*a* and 14*b*, with the cover 14*a* mounted so as to pivot about a pivot axis 15*a* in direction u1 and u2 and the cover 14*b* about a pivot axis 15*b* in directions v1 and v2.

In FIGS. 1 to 5 the cover assembly 13 is in the closed position in which the container 12 is closed by the cover assembly 13, and access to the container 12 is not possible. Objects in the container 12 cannot move out of the container 12. The cover assembly 13 is locked in the closed position by an unillustrated latch such as described in above cited DE 10 2011 120 881. Outer edges of the covers 14*a* and 14*b* facing away from the respective pivot axes 15a and 15b rest against one another in the closed position.

Figure 2:
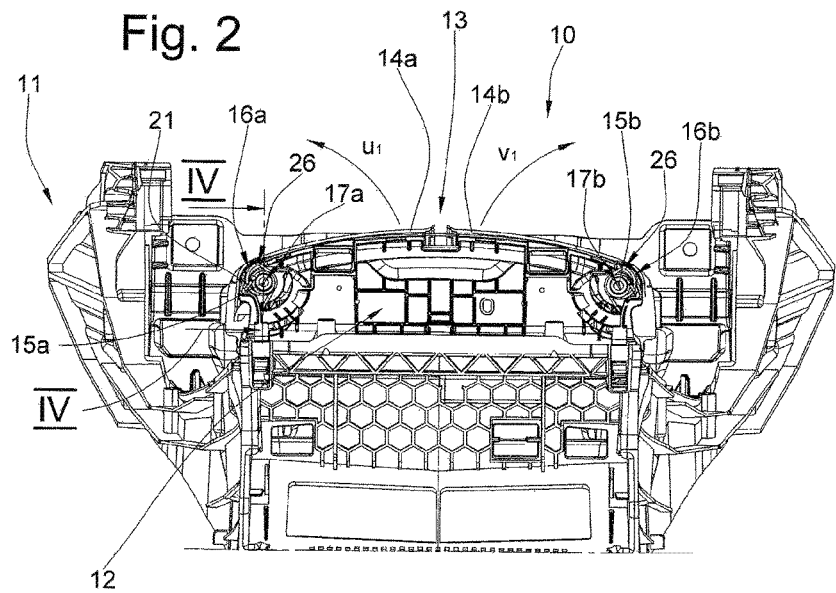
FIG. 2 is an end view taken in the direction of arrow II in FIG. 1.
Figure 3:
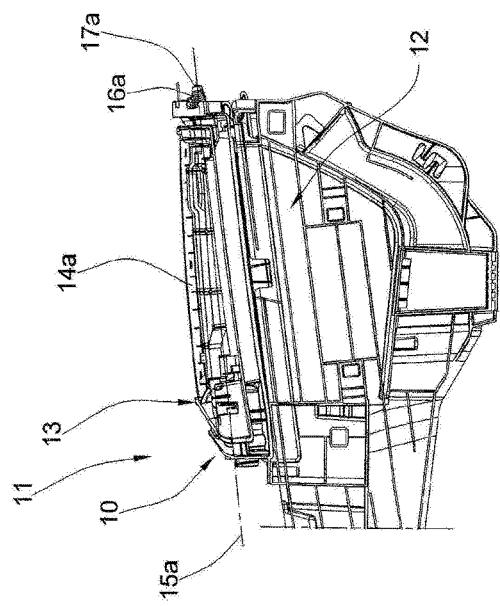
FIG. 3 is a side view taken in the direction of arrow III in FIG. 1.

The cover assembly 13 can be moved from the closed position into the open position by pivoting the covers 14a and 14b about the respective pivot axes 15a and 15b in the respective directions u1 and v1 (see FIG. 2). The covers 14a and 14b are biased by respective springs 16a and 16b into the open positions. Here, longitudinal axes of the springs 16a and 16b coincide with the respective pivot axes 15a and 15b. (The spring 16b has been omitted from FIG. 1 for clarity of view.) As soon as the latch releases the covers 14a and 14b, they are therefore moved by the respective springs 16a and 16b in the respective directions u1 and v1 into their open positions.

FIG. 2 shows that the springs 16a and 16b are carried on respective supports 17a and 17b. In this embodiment, each of the supports 17a and 17b is formed by a cylindrical sleeve that is part of the frame of the cover assembly 13. During movement between the closed position and the open position, the covers 14a and 14b move relative to the frame of the cover assembly 13. In the present illustrated embodiment, the longitudinal axis of the support 17a is coaxial with the pivot axis 15a, and the longitudinal axis of the support 17b is coaxial with the pivot axis 15b. The longitudinal axis of the spring 16a is also coaxial with the pivot axis 15a, and the longitudinal axis of the spring 16b is coaxial with the pivot axis 15b.

Figure 4:
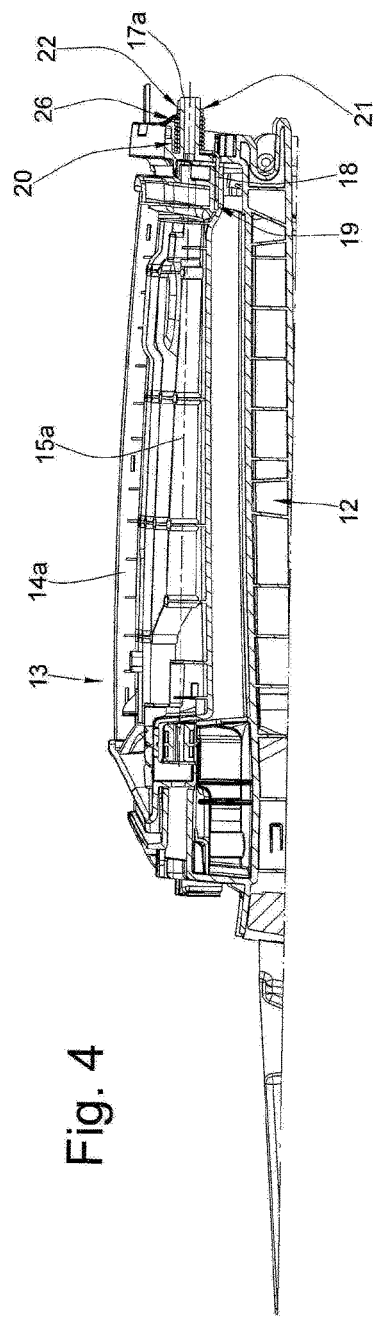
FIG. 4 is a section taken along line IV-IV of FIG. 2.
Figure 5:
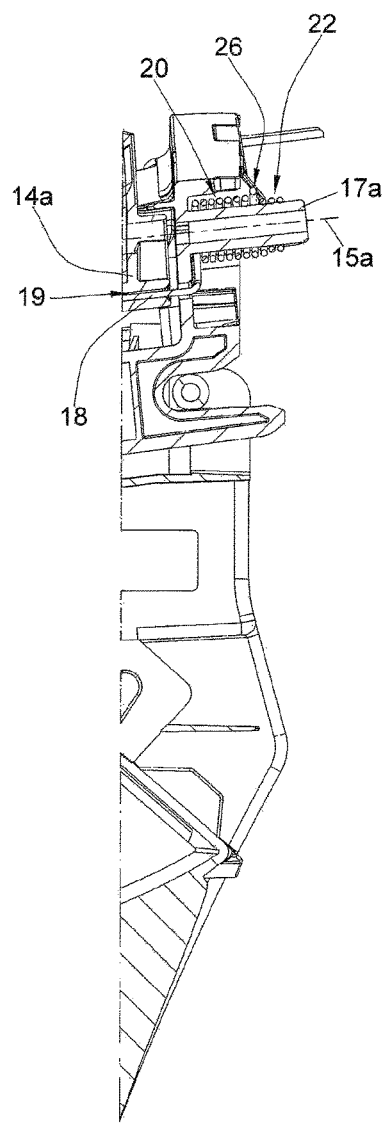
FIG. 5 is a section taken along line V-V of FIG. 1.

FIGS. 4 and 5 show that a first spring end 18 of the spring 16a is seated in a recess 19 of the cover 14a, with the recess 19 spaced radially from the respective pivot axis 15a. This first end 18 extends from an outer end of a biasing coil part 20 of the spring 16a. This biasing coil part 20 loosely or spacedly surrounds the respective support 17 and acts as a torsion spring that, due to its prestressing, biases the cover 14a into the open position. Since the recess 19 is spaced radially from the pivot axis 15a, the spring force transferred from the first spring end 18 to the cover 14a is able to produce torque that biases the cover 14a in the direction u1.

A second spring end 21 (see FIG. 5) extends from a coil part 22 of the spring 16a that tightly grips the support 17a. Before mounting on the support 17a and in a relaxed condition of the spring 16a, an inside diameter 23 of the gripping coil part 22, which is unitary with and in fact an extension of the biasing coil part 20, is undersized relative to a diameter 24 of an outer surface 25 of the support 17a. When the spring 16a is fitted to the support 17a, a friction connection is therefore formed between the gripping coil part 22 and the outer surface 25 that prevents the spring 16a from rotating about the pivot axis 15a in the direction u1 or u2. What is more, the positive connection prevents the spring 16a from moving in axial directions x1 or x2 (FIG. 9) on the support sleeve 17a.

With regard to the coaction of the spring 16b with the cover 14b, the construction and function are just like that of the spring 16a and the cover 14a, so that the cover 14a is biased by the spring 16b into the open position.

Figure 6:
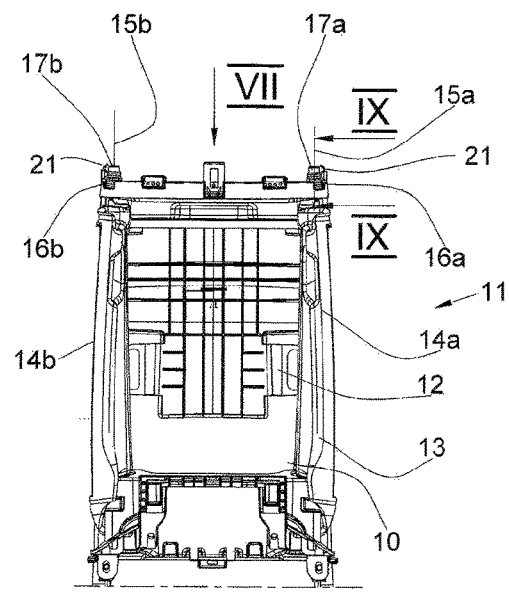
FIG. 6, like FIG. 1, is a top view of the storage compartment, but the cover assembly in the open position.
Figure 7:
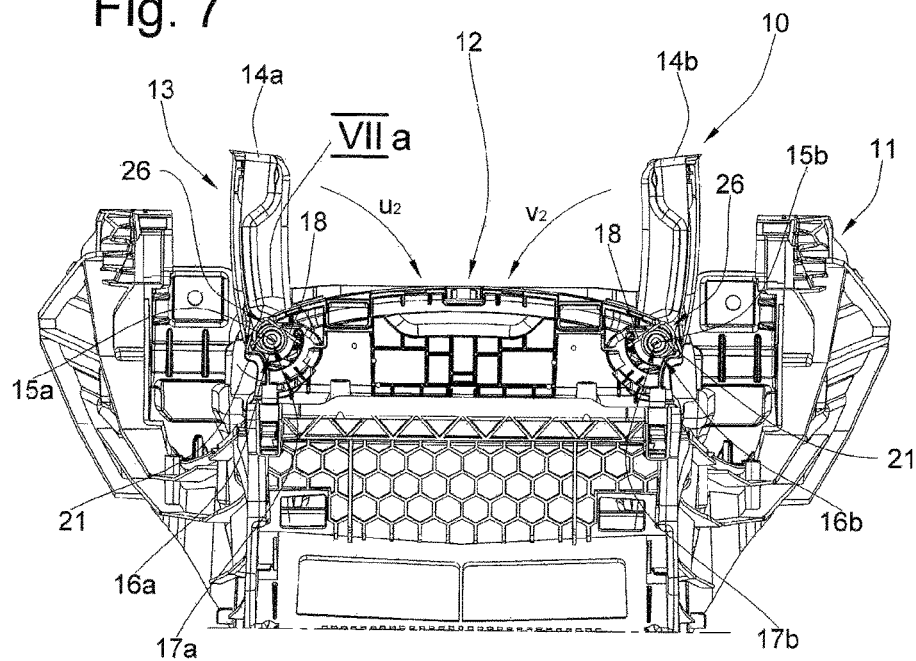
FIG. 7 is an end view taken in the direction of arrow VII in FIG. 6.
Figure 7A:
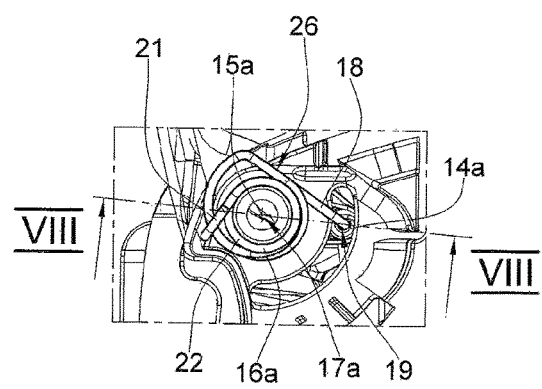
FIG. 7*a* is a large-scale view of the detail indicated at section line VIIa of FIG. 7.

FIG. 6 shows how the cover assembly 13 in the open position it can be moved into from the closed position of FIGS. 1-5. Such movement from the open position into the closed position entails pivoting of cover 14a pivoting about the pivot axis 15a in direction u2 and the cover 14b about the pivot axis 15b in direction v2 (see FIG. 7).

To install the spring 16a, and to adjust the spring force, an inside diameter 23 of the gripping part 22 can be increased by moving the second spring end 21 relative to the large-diameter biasing coil part 20 of the spring 16a about the pivot axis 15a in the direction u2. When the inside diameter 23 is increased, the spring 16a can be mounted on or removed from the support 17a, or the spring force can be adjusted. The spring force can be increased if the spring 16a is rotated about the pivot axis 15a in the direction u1. The spring force is decreased if the spring 16a is rotated in the direction u2.

The second spring end 21 is subsequently moved again in direction u1 whereupon the gripping coil part 22 released and the friction connection between the support 17a and the gripping coil part 22 is restored. The spring 16a can then no longer pivot about the pivot axis 15a. In this way, the opening characteristic and/or opening speed of the covers 14a and 14b can be changed, and movement of the covers 14a and 14b can be synchronized.

To install the spring 16b, and to adjust its spring force, the inside diameter 23 of the gripping coil part 22 can be increased in like manner by moving the second spring end 21 relative to the biasing coil part 20 of the spring 16b about the pivot axis 15b in direction v2. When the inside diameter 23 is increased, the spring 16b can be mounted on or removed from the support 17b, or the spring force can be adjusted. The spring force can be increased if the spring 16b is rotated about the pivot axis 15b in direction v1. The spring force is decreased if the spring 16b is rotated in direction v2.

The spring end 21 is subsequently moved again in the direction v1, upon which the gripping coil part 22 grips the support 17b. The spring 16b can then no longer be pivoted about the pivot axis 15b.

The biasing coil part 20 has a grip loop 26 that projects radially outward past the gripping coil part 22 and even radially outward past the biasing coil part 20 of the spring 16a and is shaped so that it can be fitted with an installation tool, so that, upon rotation of the second spring end 21 in direction u1 or u2, the biasing coil part 20 is not rotated along as well. FIG. 1 shows show the springs 16a or 16b each have a U-shaped part for engagement with a projecting lever of an inner pivoting part of the installation tool. FIG. 1 shows how the spring has a straight part for engagement with the tools outer handle. Thus the tool with the U-shaped and straight parts can be pivoted in different directions for enlarging the spring's diameter.

We claim:

1. A cover assembly comprising:
   a support defining a pivot axis;
   a cover pivotal relative to the support about the pivot axis between an open position and a closed position; and
   a torque spring having first and second ends, a biasing coil part from which the first end extends, and a gripping coil part extending from the biasing coil part and from which the second end extends, the first end being seated in the cover, the gripping coil part except when being installed or adjusted frictionally tightly and elastically engaging the support and nonrotatably securing the second end to the support against rotation relative to the pivot axis, the biasing coil part urging the cover into one of the end positions, the gripping coil part being elastically deformable during installation or adjustment to disengage from the support and allow angular or axial movement of the gripping coil part and repositioning on the support, whereby a spring force exerted by the biasing coil part and the first end of the spring on the cover can be adjusted steplessly by releasing and repositioning the gripping coil part.

2. The cover assembly defined in claim 1, wherein the support has a seat surface carrying the gripping coil part.

3. The cover assembly defined in claim 2, wherein the seat surface is cylindrical, the gripping coil part radially engaging the seat surface.

4. The cover assembly defined in claim 3, wherein the seat surface is coaxial with the pivot axis.

5. The cover assembly defined in claim 1, wherein the spring has a grippable formation engageable by a tool to frictionally disengage the gripping coil part from the support.

6. The cover assembly defined in claim 5, wherein the grippable formation fits complementarily with the tool.

7. The cover assembly defined in claim 1, wherein the grippable portion is formed by an oversize loop of the spring between the gripping and biasing coil parts.

8. The cover assembly defined in claim 1, wherein the assembly comprises two such covers, two such supports, and two such springs.

9. The cover assembly defined in claim 1, wherein the two covers have respective parallel but spaced such pivot axes and in the closed position outer edges of the covers abut.

10. The cover assembly defined in claim 1, further comprising:
a storage compartment having a frame provided with the support.

11. A cover assembly comprising:
two supports defining a pivot axis;
two respective covers pivotal relative to the respective supports about the pivot axis between open and closed end positions; and
two respective torque spring each having first and second ends, a biasing coil part from which the first end extends, and a gripping coil part extending from the biasing coil part and from which the second end extends, the first end being seated in the respective cover, the gripping coil part except when being installed or adjusted frictionally tightly and elastically engaging the respective support and nonrotatably securing the second end to the respective support against rotation relative to the pivot axis, the biasing coil parts each urging the respective cover into one of the end positions, the gripping coil parts each being elastically deformable during installation or adjustment to disengage from the support and allow angular or axial movement of the respective gripping coil part and repositioning on the respective support, whereby a spring force exerted by each biasing coil part and the first end of the respective spring on the respective cover can be adjusted steplessly by releasing and repositioning the respective gripping coil part.

* * * * *